US012615515B2

(12) United States Patent
Boettger

(10) Patent No.: US 12,615,515 B2
(45) Date of Patent: Apr. 28, 2026

(54) MINIMAL CONFIGURATION SYNTHETIC ESIM PROFILES FOR WIRELESS DEVICES

(71) Applicant: Apple Inc., Cupertino, CA (US)

(72) Inventor: David Boettger, San Jose, CA (US)

(73) Assignee: Apple Inc., Cupertino, CA (US)

( * ) Notice: Subject to any disclaimer, the term of this patent is extended or adjusted under 35 U.S.C. 154(b) by 104 days.

(21) Appl. No.: 18/905,681

(22) Filed: Oct. 3, 2024

(65) Prior Publication Data

US 2025/0031050 A1 Jan. 23, 2025

Related U.S. Application Data

(62) Division of application No. 17/649,524, filed on Jan. 31, 2022, now Pat. No. 12,127,005.

(51) Int. Cl.
| | |
|---|---|
| *H04L 29/06* | (2006.01) |
| *H04L 9/06* | (2006.01) |
| *H04L 9/08* | (2006.01) |
| *H04L 9/32* | (2006.01) |
| *H04W 12/06* | (2021.01) |
| *H04W 12/72* | (2021.01) |

(52) U.S. Cl.
CPC ........... *H04W 12/72* (2021.01); *H04L 9/0643* (2013.01); *H04L 9/0861* (2013.01); *H04L 9/3226* (2013.01); *H04W 12/06* (2013.01)

(58) Field of Classification Search
CPC ..... H04W 12/72; H04W 12/06; H04W 12/35; H04L 9/0643; H04L 9/0861; H04L 9/3226
See application file for complete search history.

(56) References Cited

U.S. PATENT DOCUMENTS

| | | | |
|---|---|---|---|
| 2006/0019635 A1 | 1/2006 | Ollila et al. | |
| 2008/0171534 A1 | 7/2008 | Holtmanns et al. | |
| 2012/0222091 A1 | 8/2012 | Castellanos Zamora et al. | |
| 2013/0170643 A1 | 7/2013 | Xiao et al. | |
| 2019/0174314 A1 * | 6/2019 | Joseph ................. | H04W 12/06 |
| 2019/0245688 A1 | 8/2019 | Patin | |
| 2021/0185540 A1 | 6/2021 | Gundavelli et al. | |
| 2021/0281409 A1 | 9/2021 | Apsingekar et al. | |
| 2021/0359853 A1 * | 11/2021 | Dalton ................. | H04L 9/0643 |
| 2023/0247436 A1 | 8/2023 | Boettger et al. | |

FOREIGN PATENT DOCUMENTS

| | | | | |
|---|---|---|---|---|
| WO | WO-2011135529 A2 * | 11/2011 | ......... | G06F 21/6218 |
| WO | WO-2017141399 A1 * | 8/2017 | ......... | G06F 21/6209 |
| WO | WO-2020158541 A1 * | 8/2020 | ............. | H04N 23/61 |

* cited by examiner

*Primary Examiner* — Shawnchoy Rahman
(74) *Attorney, Agent, or Firm* — DICKINSON WRIGHT RLLP

(57) ABSTRACT

Embodiments described herein relate to wireless communications, including methods and apparatus for configuring synthetic electronic subscriber identity module (eSIM) profiles for wireless devices based on user credentials. A synthetic eSIM profile is generated at a wireless device based on transformation of user credentials that include a user identity and user cryptographic information. The user identity can include an identifier for a user account, and the user cryptographic information can include a password for the user account. The wireless devices can use the synthetic eSIM profile to obtain and load one or more fully functional eSIM profiles to an embedded universal integrated circuit card (eUICC) to without requiring a bootstrap eSIM profile or non-cellular wireless access.

20 Claims, 13 Drawing Sheets

100
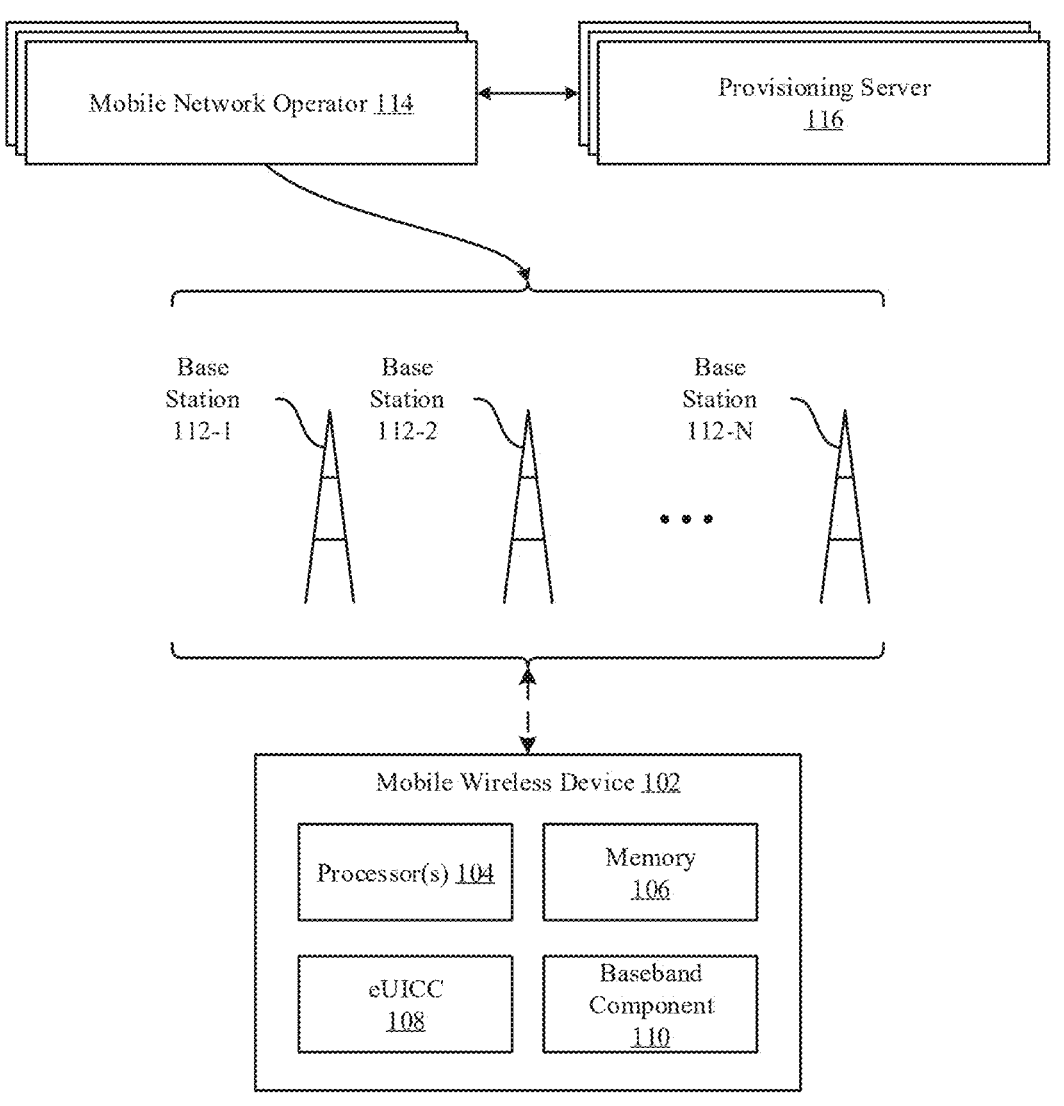
*FIG. 1*

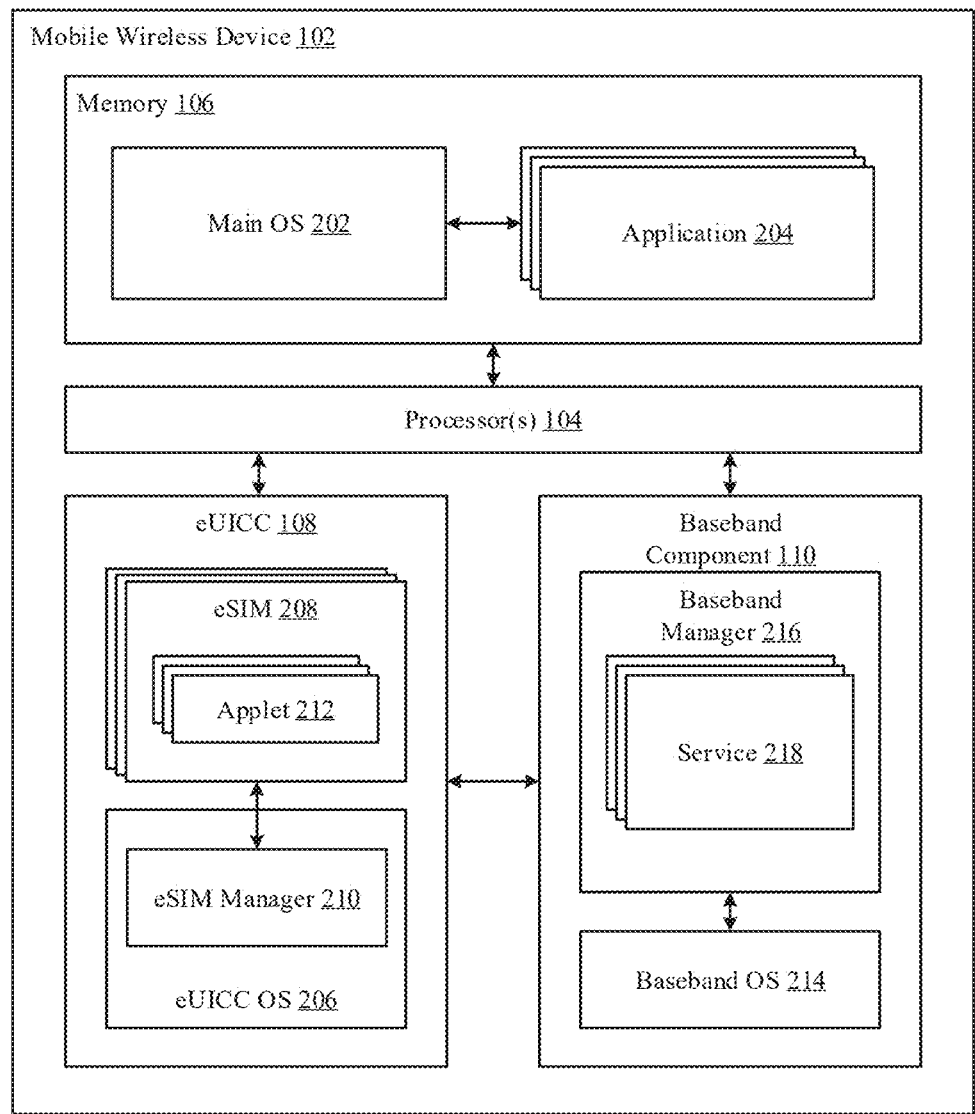
*FIG. 2*

Network Architecture
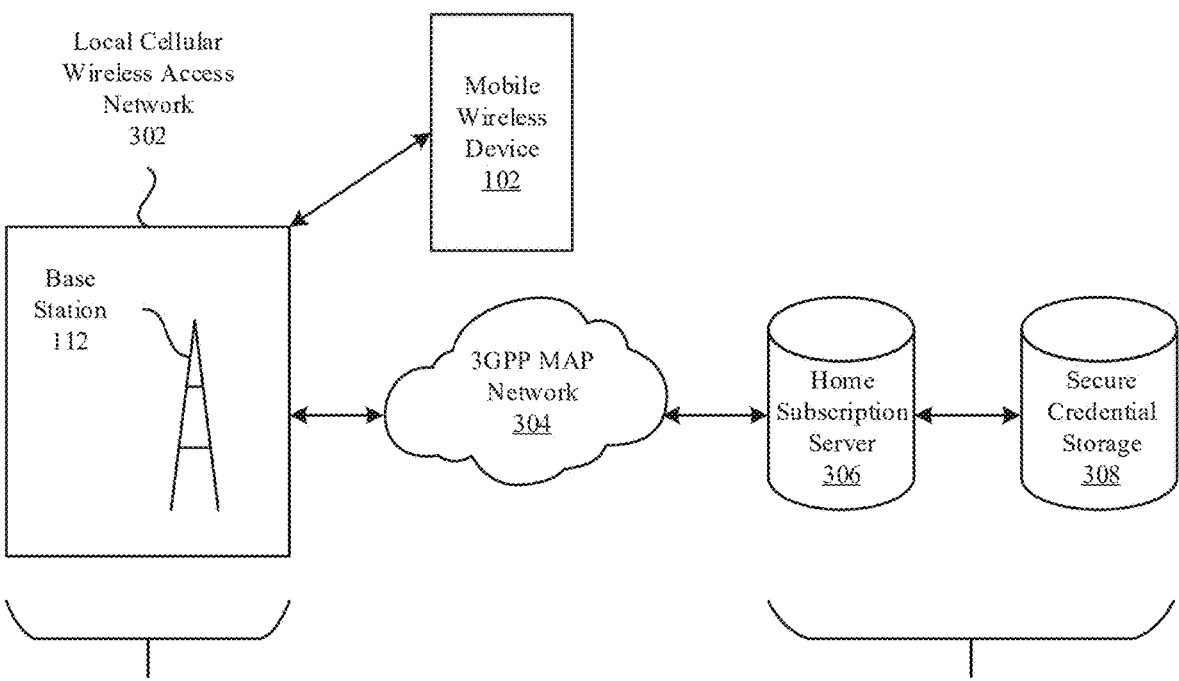
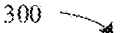
FIG. 3A

Network Deployment

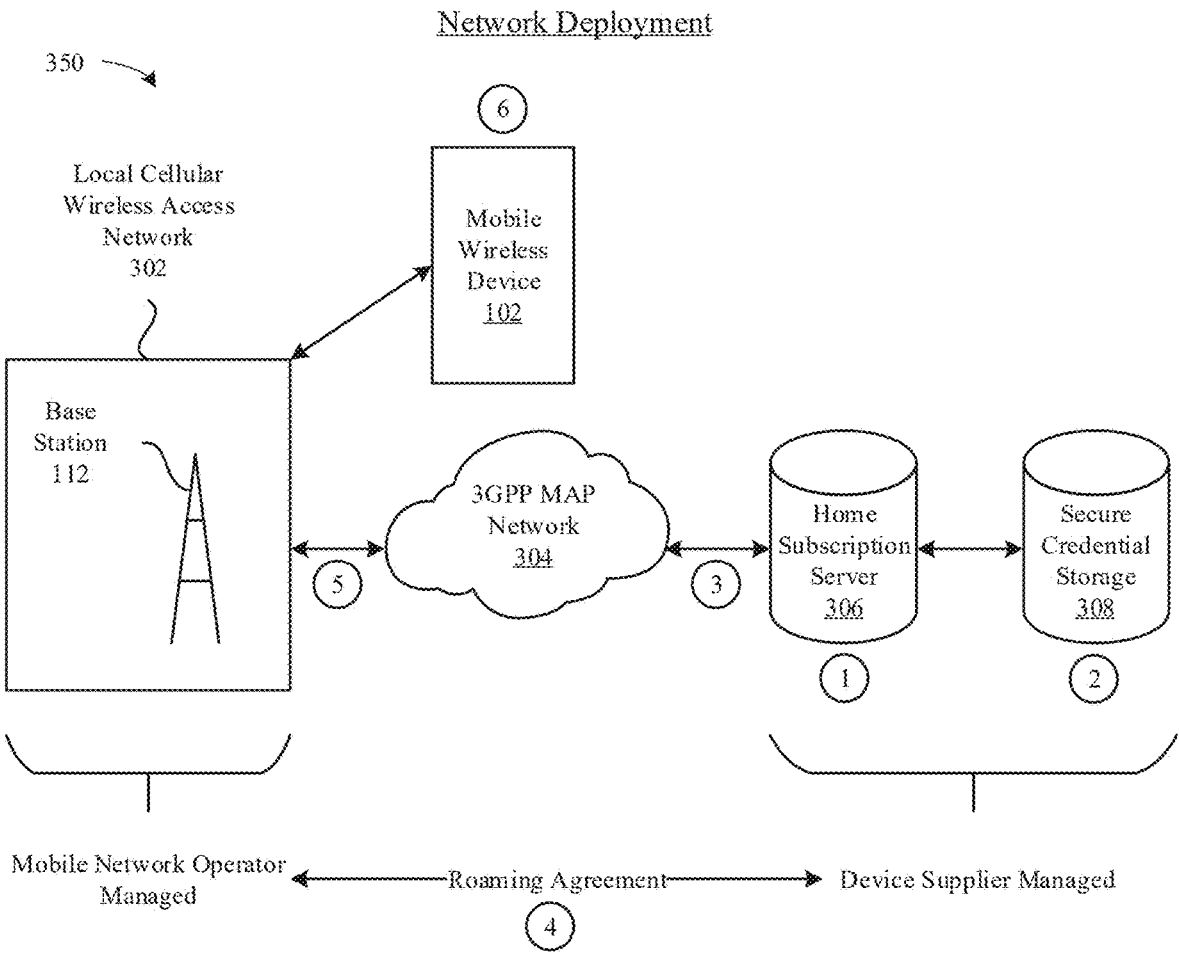

Mobile Network Operator Managed ◄————Roaming Agreement————► Device Supplier Managed

④

① Device Supplier Procures 1+ PLMN IDs and Deploys a Custom Home Subscription Server (HSS)

② Device Supplier HSS and Secure Credential Storage Linked to Allow HSS to Generate and/or Access Synthetic IMSI and K Values based on Stored Credentials ③ Device Supplier HSS Connected to 3GPP MAP Network Allowing Reachability from any Cellular Network Worldwide ④ Roaming Agreement Established with a Mobile Network Operator in a Geographic Region ⑤ Route to Device Supplier HSS Configured by Mobile Network Operator ⑥ Mobile Network Operator Ready to Accept Connections from Mobile Wireless Devices Using Synthetic eSIM Profiles

*FIG. 3B*

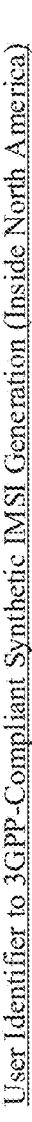
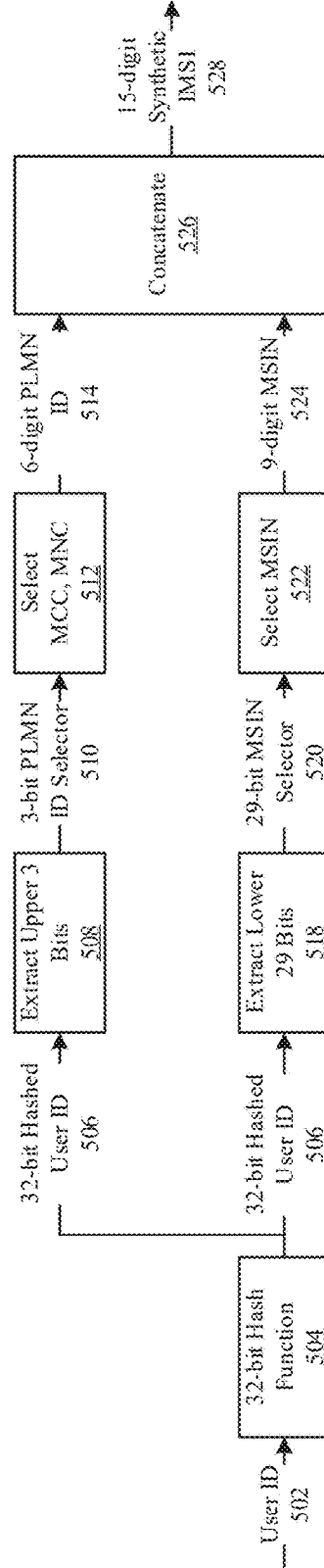
User Identifier to 3GPP-Compliant Synthetic IMSI Generation (Inside North America)
500
User ID 502
32-bit Hash Function 504
32-bit Hashed User ID 506
32-bit Hashed User ID 506
Extract Upper 3 Bits 508
Extract Lower 29 Bits 518
3-bit PLMN ID Selector 510
29-bit MSIN Selector 520
Select MCC, MNC 512
Select MSIN 522
6-digit PLMN ID 514
9-digit MSIN 524
Concatenate 526
15-digit Synthetic IMSI 528
FIG. 5A User Identifier to 3GPP-Compliant Synthetic IMSI Generation (Outside North America)

550

User ID
502

32-bit Hash
Function
504

32-bit Hashed
User ID
506

1-bit Pad to
33 Bits
552

33-bit MSIN
Selector
554

Select MSIN
556

10-digit MSIN
558

Select
MCC, MNC
560

5-digit PLMN
ID
562

Concatenate
564

15-digit
Synthetic
IMSI
566

User Cryptographic Value to 3GPP-Compliant Synthetic K Value

570

User Cryptographic Value
572

User ID
502

Concatenate

User Cryptographic Information
574

128-bit Hash Function
576

128-bit Synthetic K Value
578

600

700

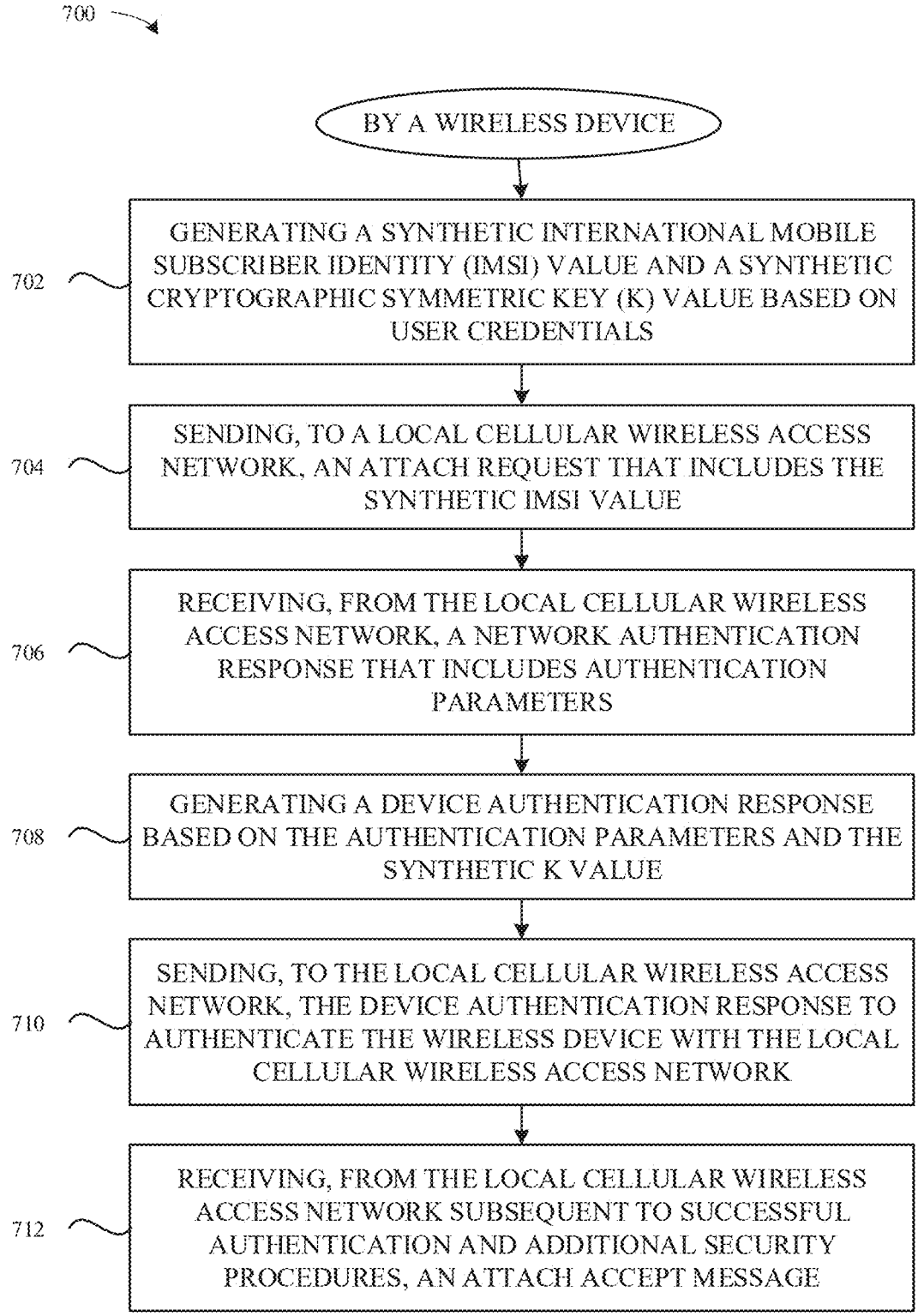

BY A WIRELESS DEVICE

702   GENERATING A SYNTHETIC INTERNATIONAL MOBILE SUBSCRIBER IDENTITY (IMSI) VALUE AND A SYNTHETIC CRYPTOGRAPHIC SYMMETRIC KEY (K) VALUE BASED ON USER CREDENTIALS

704   SENDING, TO A LOCAL CELLULAR WIRELESS ACCESS NETWORK, AN ATTACH REQUEST THAT INCLUDES THE SYNTHETIC IMSI VALUE

706   RECEIVING, FROM THE LOCAL CELLULAR WIRELESS ACCESS NETWORK, A NETWORK AUTHENTICATION RESPONSE THAT INCLUDES AUTHENTICATION PARAMETERS

708   GENERATING A DEVICE AUTHENTICATION RESPONSE BASED ON THE AUTHENTICATION PARAMETERS AND THE SYNTHETIC K VALUE

710   SENDING, TO THE LOCAL CELLULAR WIRELESS ACCESS NETWORK, THE DEVICE AUTHENTICATION RESPONSE TO AUTHENTICATE THE WIRELESS DEVICE WITH THE LOCAL CELLULAR WIRELESS ACCESS NETWORK

712   RECEIVING, FROM THE LOCAL CELLULAR WIRELESS ACCESS NETWORK SUBSEQUENT TO SUCCESSFUL AUTHENTICATION AND ADDITIONAL SECURITY PROCEDURES, AN ATTACH ACCEPT MESSAGE

*FIG. 7*

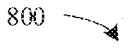

800

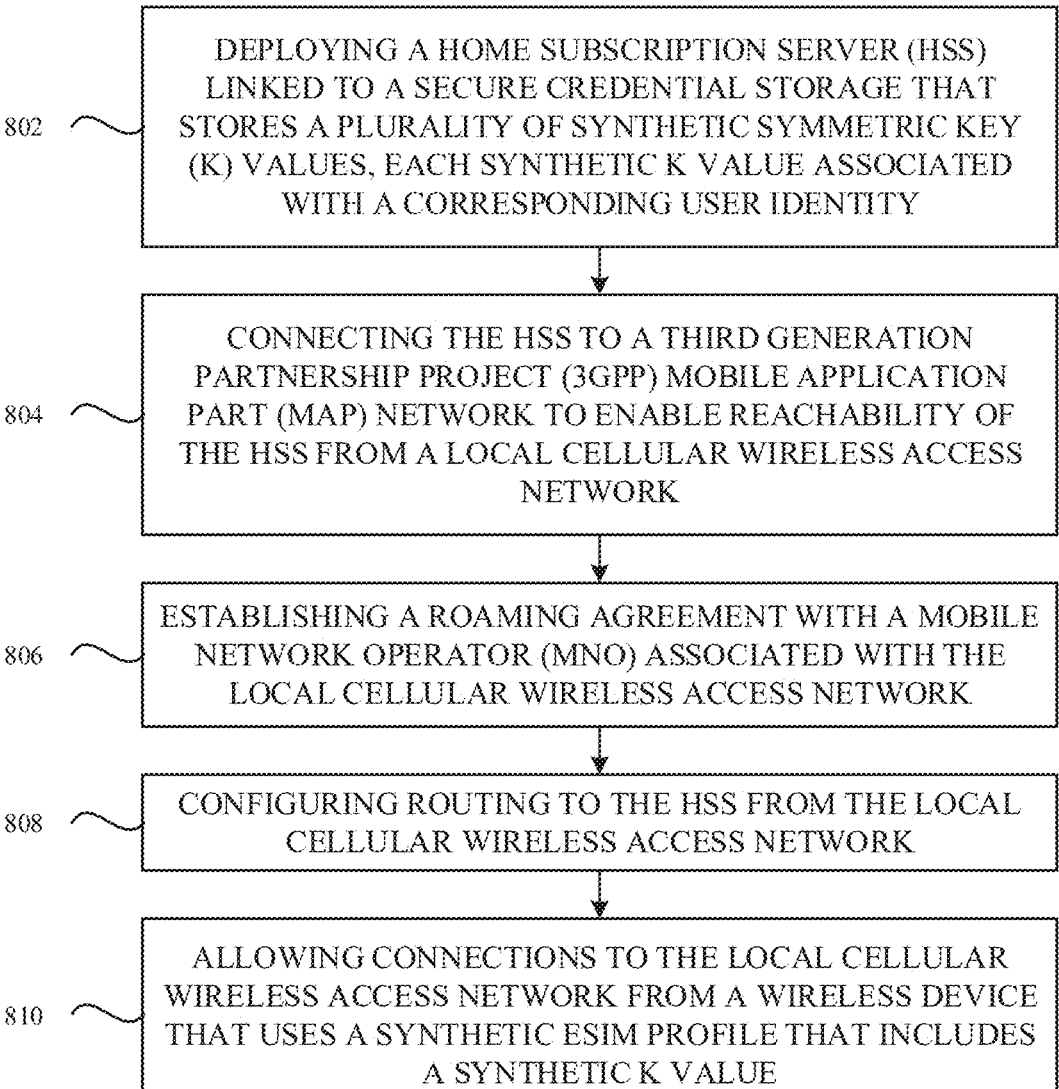

802 — DEPLOYING A HOME SUBSCRIPTION SERVER (HSS) LINKED TO A SECURE CREDENTIAL STORAGE THAT STORES A PLURALITY OF SYNTHETIC SYMMETRIC KEY (K) VALUES, EACH SYNTHETIC K VALUE ASSOCIATED WITH A CORRESPONDING USER IDENTITY

804 — CONNECTING THE HSS TO A THIRD GENERATION PARTNERSHIP PROJECT (3GPP) MOBILE APPLICATION PART (MAP) NETWORK TO ENABLE REACHABILITY OF THE HSS FROM A LOCAL CELLULAR WIRELESS ACCESS NETWORK

806 — ESTABLISHING A ROAMING AGREEMENT WITH A MOBILE NETWORK OPERATOR (MNO) ASSOCIATED WITH THE LOCAL CELLULAR WIRELESS ACCESS NETWORK

808 — CONFIGURING ROUTING TO THE HSS FROM THE LOCAL CELLULAR WIRELESS ACCESS NETWORK

810 — ALLOWING CONNECTIONS TO THE LOCAL CELLULAR WIRELESS ACCESS NETWORK FROM A WIRELESS DEVICE THAT USES A SYNTHETIC ESIM PROFILE THAT INCLUDES A SYNTHETIC K VALUE

*FIG. 8*

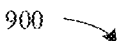
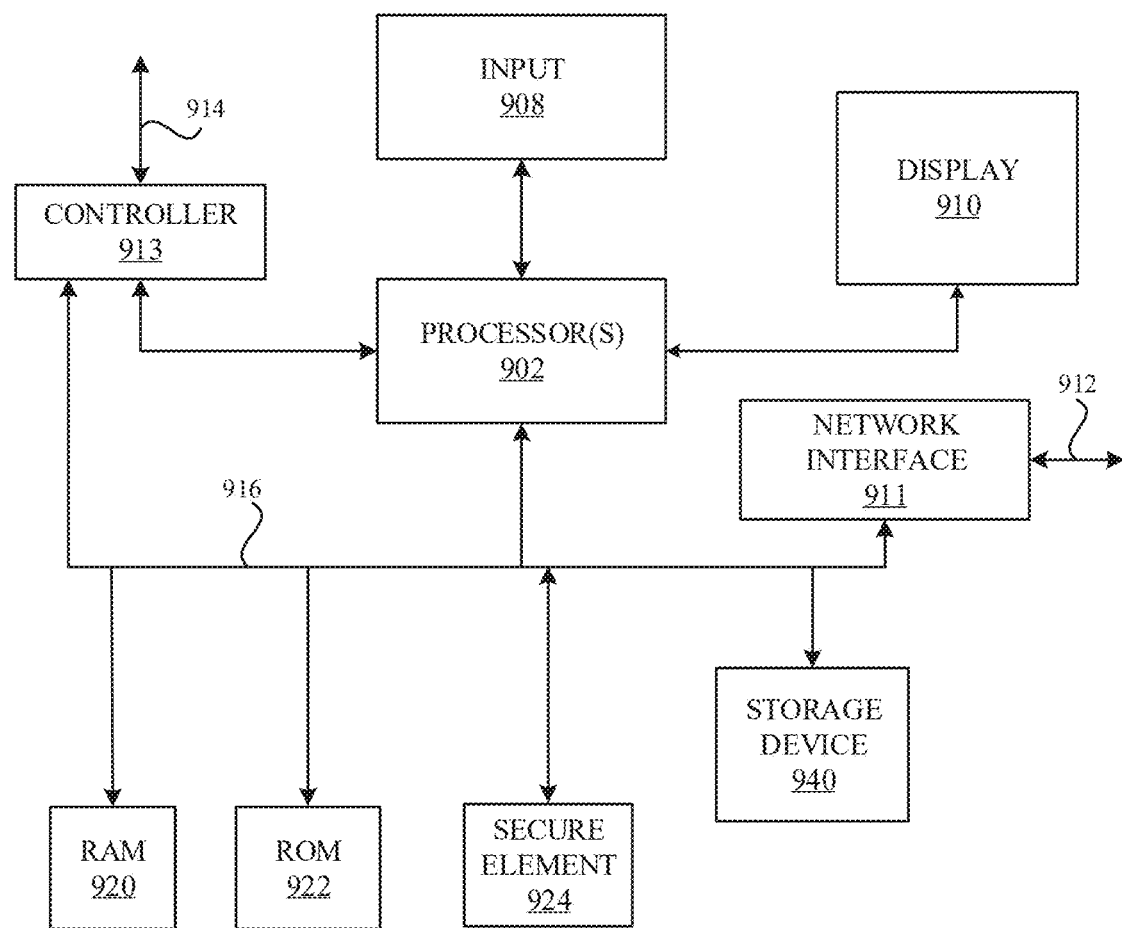
*FIG. 9*

MINIMAL CONFIGURATION SYNTHETIC ESIM PROFILES FOR WIRELESS DEVICES

CROSS-REFERENCE TO RELATED APPLICATIONS

The present application is a divisional of U.S. application Ser. No. 17/649,524, entitled "MINIMAL CONFIGURA-TION SYNTHETIC eSIM PROFILES FOR WIRELESS DEVICES," filed Jan. 31, 2022, the content of which is incorporated by reference herein in its entirety for all pur-poses.

FIELD

The described embodiments relate to wireless communi-cations, including methods and apparatus for synthesizing electronic subscriber identity module (eSIM) profiles for wireless devices based on user credentials. The wireless devices can load one or more fully functional eSIM profiles to an embedded universal integrated circuit card (eUICC) without requiring a pre-loaded, limited functionality "boot-strap" eSIM profile or non-cellular wireless access to con-nect to a provisioning server.

BACKGROUND

Newer generation, e.g., fourth generation (4G) and fifth generation (5G), cellular wireless networks that implement one or more 3$^{rd}$ Generation Partnership Project (3GPP) Long Term Evolution (LTE), LTE Advanced (LTE-A), and 5G standards are rapidly being developed and deployed by mobile network operators (MNOs) worldwide. In addition, sixth generation (6G) standards are in active development. The newer cellular wireless networks provide a range of packet-based services, with 5G (and 6G) technology pro-viding increased data throughput and lower latency connec-tions that promise enhanced mobile broadband services for 5G-capable (and 6G-capable) wireless devices. Wireless local area networks, such as Wi-Fi networks, additionally provide access to communication network services, includ-ing cellular based services, such as Wi-Fi calling. Access to cellular services provided by an MNO, including access via a non-cellular wireless network such as Wi-Fi, by an elec-tronic device can require access to cellular credentials and/or secure processing provided by a secure element (SE), such as by an embedded universal integrated circuit card (eUICC) included in the electronic device.

Typically, mobile wireless devices have been configured to use removable universal integrated circuit cards (UICCs) that provide access to services of an MNO. In particular, each UICC includes at least a microprocessor and a read-only memory (ROM), where the ROM is configured to store an MNO profile, also referred to as subscriber identity module (SIM) or SIM profile, which the wireless device can use to register and interact with an MNO to obtain wireless services via a cellular wireless network. The SIM profile hosts subscriber data, such as a digital identity and one or more cryptographic keys, to allow the wireless device to communicate with a cellular wireless network. Typically, a UICC takes the form of a small removable card, commonly referred to as a SIM card or physical SIM (pSIM) card, which can be inserted into a UICC-receiving bay of a mobile wireless device. In more recent implementations, UICCs are being embedded directly into system boards of wireless devices as embedded UICCs (eUICCs), which can provide advantages over traditional, removable UICCs. The eUICCs can include a rewritable memory that can facilitate installation, modification, and/or deletion of one or more electronic SIMs (eSIMs) on the eUICC, where the eSIMs can provide for new and/or different services and/or updates for accessing extended features provided by MNOs. An eUICC can store a number of MNO profiles—also referred to herein as eSIMs—and can eliminate the need to include UICC-receiving bays in wireless devices. SIM cards have reduced in size over the years, but still require volume within the wireless devices to accommodate them, particu-larly for wireless devices that can support the use of multiple profiles. In addition, some wireless device form factors, such as wearable devices, certain Internet of Things (IoT) devices, and machine-to-machine (M2M) devices can lack the volume to support the use of physical SIM cards. The use of eSIMs is expected to continue to increase and replace the use of physical SIMs.

Downloading an eSIM profile to a wireless device can require an Internet connection; however, without a SIM card or a pre-loaded, special-purpose, limited functionality, "bootstrap" eSIM, the wireless device can be incapable of establishing a cellular wireless connection in order to down-load the eSIM profile. (A "bootstrap" eSIM can refer to an eSIM that provides limited cellular wireless access for one or more specific purposes, such as to download a fully functional eSIM, but cannot be used for "normal" cellular wireless service.) A non-cellular wireless connection may also be unavailable to download the eSIM profile. Thus, there exists a need for enabling a wireless device to establish a cellular connection without the use of a SIM card, a "bootstrap" eSIM, or a non-cellular wireless connection.

SUMMARY

The described embodiments relate to wireless communi-cations, including methods and apparatus for generating synthetic electronic subscriber identity module (eSIM) pro-files for wireless devices with minimal configuration. A cellular-capable wireless device without a physical SIM card or a pre-loaded, special-purpose, limited functionality, "bootstrap" eSIM can generate a synthetic eSIM based on user credentials, such as a user identity and user crypto-graphic information. In some embodiments, the user identity includes an identifier for a user account, and the user cryptographic information includes a password for access-ing the user account. The user account identifier and user cryptographic information are transformed using crypto-graphic functions to generate a valid, synthetic international mobile subscriber identity (IMSI) value and a valid, syn-thetic cellular wireless domain cryptographic symmetric key (K) value. The IMSI value and the K value can be merged with additional pre-stored or runtime-generated information to form a synthetic eSIM profile that can be used to authenticate with and establish a connection to a local cellular wireless access network. In some embodiments, the synthetic eSIM profile can be a fully functional eSIM profile associated with a mobile network operator (MNO). In some embodiments, a separate, fully functional eSIM profile for an MNO can be selected and downloaded by the wireless device via the connection to the local cellular wireless access network established using the synthetic eSIM profile. The IMSI value can be applicable to a geographic region selected for operation of the wireless device. In some embodiments, a device manufacturer of the wireless device maintains a home subscription server (HSS) that is reachable by the local cellular wireless access network via routing of a 3GPP mobile application part (MAP) network. In some embodiments, the device manufacturer and the mobile network operator (MNO) that manages the local cellular wireless access network have a roaming agreement. In some embodiments, the device manufacturer of the wireless device maintains a secure credential storage system linked to the HSS and storing synthetic K values corresponding to the synthetic IMSI values. In some embodiments, the secure credential store generates the synthetic IMSI and K values based on the user account identifier and user account password. In some embodiments, the secure credential store generates multiple synthetic IMSI and K values based on the user account identifier and user account password, each pair of synthetic IMSI and K values applicable to a distinct geographic region. In some embodiments, during authentication of the wireless device with the local cellular wireless access network, the secure credential store can determine an applicable synthetic K value based on a synthetic IMSI value and a public land mobile network (PLMN) identifier provided by the HSS. The secure credential store can return the determined synthetic K value to the HSS to provide to the local cellular wireless access network for authentication of the wireless device. In some embodiments, an MNO generates a synthetic IMSI value and a synthetic K value for a wireless device based on user credentials of a subscriber and allows the wireless device to authenticate via a local cellular wireless access network of the MNO using a synthetic eSIM that includes corresponding synthetic IMSI and K values generated at the wireless device. In some embodiments, the synthetic eSIM can be used as a fully functional eSIM associated with the MNO. In some embodiments, the synthetic eSIM can be used to obtain a fully functional eSIM from a provisioning server of the MNO (or of another MNO) by the wireless device without requiring access via a physical SIM, a bootstrap eSIM, or a non-cellular wireless connection. In some embodiments, the synthetic eSIM is maintained on the eUICC of the wireless device for future use. In some embodiments, the synthetic eSIM is discarded after a fully functional eSIM is loaded successfully on the eUICC of the wireless device.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

FIG. 1 illustrates a block diagram of different components of an exemplary system configured to implement cellular service access and provisioning for a wireless device, according to some embodiments.

FIG. 2 illustrates a block diagram of a more detailed view of exemplary components of a mobile wireless device of the system of FIG. 1, according to some embodiments.

FIG. 3A illustrates a block diagram of an exemplary network architecture that supports generation and use of synthetic eSIM profiles, according to some embodiments.

FIG. 3B illustrates a block diagram that specifies a set of actions taken to deploy the network illustrated in FIG. 3A, according to some embodiments.

FIG. 5A illustrates a block diagram of an exemplary transformation of a user identity to a 3GPP-compliant synthetic IMSI value for use inside the North America geographic region, according to some embodiments.

FIG. 7 illustrates a flowchart of an exemplary set of actions performed by a wireless device to authenticate with a local cellular wireless access network, according to some embodiments.

FIG. 8 illustrates a flowchart of an exemplary set of actions to deploy a cellular wireless network that supports synthetic eSIMs, according to some embodiments.

FIG. 9 illustrates a block diagram of exemplary elements of a wireless device, according to some embodiments.

DETAILED DESCRIPTION

Figure 4A:
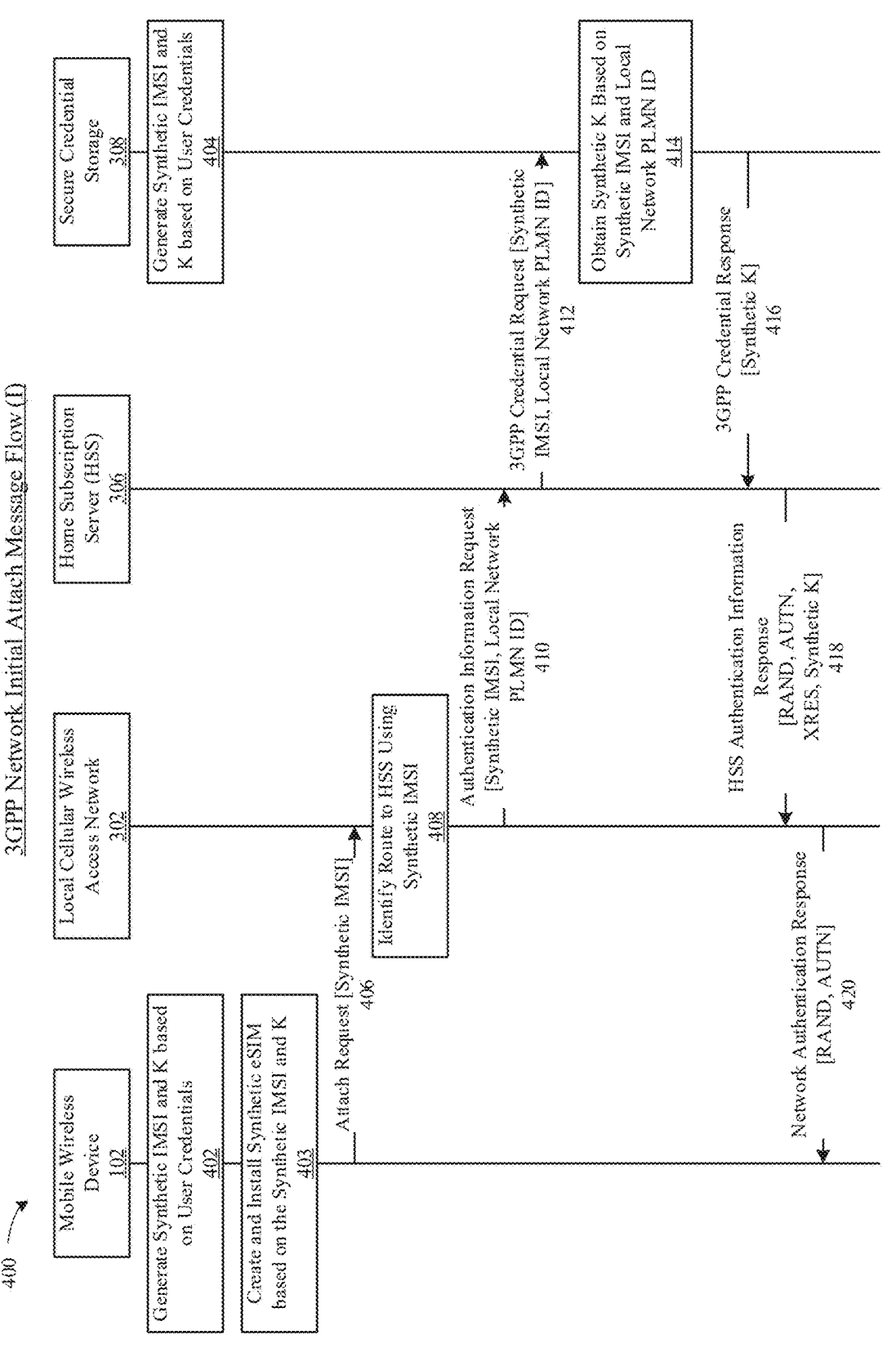
FIGS. 4A and 4B illustrate block diagrams of an exemplary set of actions to generate and use a synthetic eSIM to attach a mobile wireless device to a local cellular wireless access network, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

This application relates to wireless communications, including methods and apparatus for generating synthetic electronic subscriber identity module (eSIM) profiles for wireless devices with minimal configuration. Cellular-capable wireless devices require a SIM profile, which includes a digital identity and cryptographic information, to authenticate with and obtain service from a cellular wireless network. Physical SIM cards, which consume interior volume of wireless devices are being replaced or supplemented by eSIMs loaded on a secure element (SE), e.g., an embedded universal integrated circuit card (eUICC), of a wireless device. Loading an eSIM to the eUICC of a wireless device can require an Internet connection to download the eSIM from an applicable mobile network operator (MNO) provisioning server (or other network-based eSIM distribution entity). Without an initial pre-loaded physical SIM card, a special-purpose, limited functionality, "bootstrap" eSIM, or a fully functional pre-loaded eSIM installed on the wireless device, and when a non-cellular wireless connection is unavailable or otherwise cannot be used, the wireless device can be unable to establish the required connection to a cellular wireless access network to obtain a fully functional eSIM.

A cellular-capable wireless device without a physical SIM card or bootstrap eSIM can generate a synthetic eSIM based on user credentials, such as a user identity and user cryptographic information. In some embodiments, the user identity includes an identifier for a user account, and the user cryptographic information includes a password for accessing the user account. The user account can be associated with a device manufacturer of the wireless device, e.g., a cloud-network based service, such as iCloud®. Alternatively, the user account can be associated with a subscription to a cellular service of an MNO. The user account identifier and user cryptographic information are transformed using cryptographic functions to generate a valid, synthetic international mobile subscriber identity (IMSI) value and a valid, synthetic cellular wireless domain cryptographic symmetric key (K) value. The synthetic IMSI value and the synthetic K value can be merged at the wireless device with additional pre-stored or runtime-generated information to form a synthetic eSIM profile that can be used by the wireless device to authenticate with and establish a connection to a local cellular wireless access network. In some embodiments, the local cellular wireless access network is managed by an MNO with which the device manufacturer of the wireless device maintains a roaming agreement. In some embodiments, the local cellular wireless access network is managed by an MNO with which a user of the wireless device maintains a subscription for cellular wireless service. In some embodiments, the synthetic eSIM profile can be a fully functional eSIM profile associated with an MNO. In some embodiments, after establishing a connection with the local cellular wireless access network, a user of the wireless device can select one or more fully functional eSIM profiles associated with one or more MNOs to download to and install on the eUICC of the wireless device via the connection. The fully functional eSIM profiles can be downloaded from provisioning servers and/or from other network-based eSIM distribution entities.

The synthetic IMSI value generated by the wireless device can be applicable to a geographic region selected for operation of the wireless device. In some embodiments, the wireless device generates the synthetic IMSI value based on a 32-bit hash value generated using the user identity as an input to a hash function. In some embodiments, select bits of the 32-bit hash value are used to determine a public land mobile network (PLMN) identifier (ID) value, such as a mobile country code (MCC) value and a mobile network code (MNC) value for the PLMN ID value. In some embodiments, select bits of the 32-bit value are mapped to a nine-digit mobile subscriber identity number (MSIN) value applicable for use of the wireless device within the North America region. In some embodiments, one bit is added to the 32-bit value to form a 33-bit value that is used to determine a ten-digital MSIN value applicable for outside of the North America region. In some embodiments, the synthetic K value is a 128-bit hash value output from a hash function using a concatenation of the user identity and the user cryptographic information, such as a user account password, as the input to the hash function.

In some embodiments, a device manufacturer of the wireless device maintains a home subscription server (HSS) that is reachable by the local cellular wireless access network via routing of a 3GPP mobile application part (MAP) network. In some embodiments, the device manufacturer and the mobile network operator (MNO) that manages the local cellular wireless access network have a roaming agreement established between them. In some embodiments, the device manufacturer of the wireless device maintains a secure credential storage system linked to the HSS and storing synthetic K values corresponding to the synthetic IMSI values. In some embodiments, the secure credential store generates the synthetic IMSI and K values based on the user credentials, such as the user account identifier and the user account password. In some embodiments, the secure credential store generates multiple synthetic IMSI and K values based on the user credentials, e.g., the user account identifier and user account password, each pair of synthetic IMSI and K values applicable to a distinct geographic region. During authentication of the wireless device with the local cellular wireless access network, the secure credential store can determine an applicable synthetic K value based on a synthetic IMSI value and a public land mobile network (PLMN) identifier provided by the HSS and return the determined synthetic K to the HSS to provide to the local cellular wireless access network for authentication of the wireless device.

In some embodiments, an MNO generates a synthetic IMSI value and a synthetic K value for a wireless device based on user credentials of a subscriber and allows the wireless device to authenticate via a local cellular wireless access network of the MNO using a synthetic eSIM that includes corresponding synthetic IMSI and K values generated at the wireless device. The MNO can store synthetic IMSI and K values in secure storage and/or an HSS. The synthetic IMSI and K values can be appropriate for a geographic region in which the wireless device is designated to operate and/or in which the wireless device seeks to obtain cellular wireless service from the MNO. In some embodiments, the synthetic eSIM can be used as a fully functional eSIM associated with the MNO. In some embodiments, after establishing a connection using the synthetic eSIM, the wireless device can obtain a fully functional eSIM from an MNO provisioning server or from another eSIM distribution entity. A synthetic eSIM can be used for obtaining a fully functional eSIM of the MNO (or of another MNO) by the wireless device without requiring cellular wireless access via a physical SIM or via a special-purpose, limited-functionality, "bootstrap" eSIM, or requiring a non-cellular wireless connection. In some embodiments, the synthetic eSIM is maintained on the eUICC of the wireless device for future use. In some embodiments, the synthetic eSIM is discarded after a fully functional eSIM is loaded successfully on the eUICC of the wireless device.

These and other embodiments are discussed below with reference to FIGS. 1 through 9; however, those skilled in the art will readily appreciate that the detailed description given herein with respect to these figures is for explanatory purposes only and should not be construed as limiting.

FIG. 1 illustrates a block diagram of different components of a system 100 that includes i) a mobile wireless device 102, which can also be referred to as a wireless device, a wireless communication device, a mobile device, a user equipment (UE), a device, a primary wireless device, a secondary wireless device, an accessory wireless device, a cellular-capable wearable device, and the like, ii) a group of base stations 112-1 to 112-N, which are managed by different Mobile Network Operators (MNOs) 114, and iii) a set of provisioning servers 116 that are in communication with the MNOs 114. The mobile wireless device 102 can represent a mobile computing device (e.g., an iPhone®, an iPad®, or an Apple Watch® by Apple®), the base stations 112-1 to 112-N can represent cellular wireless network entities including fourth generation (4G) Long Term Evolution (LTE) evolved NodeBs (eNodeBs or eNBs), fifth generation (5G) NodeBs (gNodeBs or gNBs), and/or sixth generation (6G) NodeBs that are configured to communicate with the mobile wireless device 102, and the MNOs 114 can represent different wireless service providers that provide specific services (e.g., voice, data, video, messaging) to which a user of the mobile wireless device 102 can subscribe to access the services via the mobile wireless device 102. Applications resident on the mobile wireless device 102 can advantageously access services using 4G LTE connections, 5G connections, and/or 6G connections (when available) via the base stations 112. The mobile wireless device 102 can include processing circuitry, which can include one or more processors 104 and a memory 106, an embedded Universal Integrated Circuit Card (eUICC) 108, and a baseband component 110. The one or more processors 104 can include one or more wireless processors, such as a cellular baseband component, a wireless local area network processor, a wireless personal area network processor, a near-field communication processor, and one or more system-level application processors. The components of the mobile wireless device 102 work together to enable the mobile wireless device 102 to provide useful features to a user of the mobile wireless device 102, such as cellular wireless network access, non-cellular wireless network access, localized computing, location-based services, and Internet connectivity. The eUICC 108 can be configured to store multiple electronic SIMs (eSIMs) for accessing services offered by one or more different MNOs 114 via communication through base stations 112-1 to 112-N. To be able to access services provided by the MNOs, one or more eSIMs can be provisioned to the eUICC 108 of the mobile wireless device 102. In some embodiments, the mobile wireless device 102 is manufactured, configured, and shipped to a distributor, retailer, or user without including a physical SIM card (or without capability to include a physical SIM card) and without a pre-stored, special-purpose, limited-functionality, "bootstrap" eSIM installed on the eUICC 108 of the mobile wireless device. To gain access to a cellular wireless connection to download a fully functional eSIM, the mobile wireless device 102 generates a synthetic eSIM based on user credentials for a user of the mobile wireless device 102, where the synthetic eSIM can be used to connect to a provisioning server 116 via a local cellular wireless access network. In some embodiments, the synthetic eSIM generated by the mobile wireless device 102 can be a fully functional eSIM itself, and one or more additional fully functional eSIMs may be optionally downloaded to the mobile wireless device 102.

FIG. 2 illustrates a block diagram 200 of a more detailed view of exemplary components of a mobile wireless device 102 of the system 100 of FIG. 1. The one or more processors 104, in conjunction with the memory 106, can implement a main operating system (OS) 202 that is configured to execute applications 204 (e.g., native OS applications and user applications). The one or more processors 104 can include applications processing circuitry and, in some embodiments, wireless communications control circuitry. The applications processing circuitry can monitor application requirements and usage to determine recommendations about communication connection properties, such as bandwidth and/or latency, and provide information to the communications control circuitry to determine suitable wireless connections for use by particular applications. The communications control circuitry can process information from the applications processing circuitry as well as from additional circuitry, such as the baseband component 110, and other sensors (not shown) to determine states of components of the mobile wireless device 102, e.g., reduced power modes, as well as of the mobile wireless device 102 as a whole, e.g., mobility states. The mobile wireless device 102 further includes an eUICC 108 that can be configured to implement an eUICC OS 206 to manage the hardware resources of the eUICC 108 (e.g., a processor and a memory embedded in the eUICC 108). The eUICC OS 206 can also be configured to manage eSIMs 208 that are stored by the eUICC 108, e.g., by enabling, disabling, modifying, updating, or otherwise performing management of the eSIMs 208 within the eUICC 108 and providing the baseband component 110 with access to the eSIMs 208 to provide access to wireless services for the mobile wireless device 102. The eUICC OS 206 can include an eSIM manager 210, which can perform management functions for various eSIMs 208. Each eSIM 208 can include a number of applets 212 that define the manner in which the eSIM 208 operates. For example, one or more of the applets 212, when implemented by the baseband component 110 and the eUICC 108, can be configured to enable the mobile wireless device 102 to communicate with an MNO 114 and provide useful features (e.g., phone calls and internet) to a user of the mobile wireless device 102.

A baseband component 110 of the mobile wireless device 102 can include a baseband OS 214 that is configured to manage hardware resources of the baseband component 110 (e.g., a processor, a memory, different radio components, etc.). The baseband component 110 can also be referred to as a wireless baseband component, a baseband wireless processor, a cellular baseband component, a cellular component, and the like. According to some embodiments, the baseband component 110 can implement a baseband manager 216 that is configured to interface with the eUICC 108 to establish a secure channel with a provisioning server 116 and obtain information (such as eSIM data) from the provisioning server 116 for purposes of managing eSIMs 208. The baseband manager 216 can be configured to implement services 218, which represent a collection of software modules that are instantiated by way of the various applets 212 of enabled eSIMs 208 that are included in the eUICC 108. For example, services 218 can be configured to manage different connections between the mobile wireless device 102 and MNOs 114 according to the different eSIMs 208 that are enabled within the eUICC 108.

To obtain fully functional eSIMs 208, the mobile wireless device 102 can connect to one or more provisioning servers 116 associated with one or more MNOs 114. In a mobile wireless device 102 without a physical SIM card installed or without a pre-loaded, special purpose, limited functionality, "bootstrap" eSIM 208 to provide cellular connectivity and without non-cellular wireless connectivity available (or otherwise not usable), the mobile wireless device 102 can generate a synthetic eSIM 208. In some embodiments, the synthetic eSIM 208 can be used as a fully functional eSIM 208 associated with an MNO 114. In some embodiments, the synthetic eSIM 208 can be used to acquire one or more fully functional eSIMs 208 from one or more provisioning servers 116 of one or more MNOs 114 via a connection to a local cellular wireless access network. The synthetic eSIM 208 can be generated at the mobile wireless device 102, during and/or after delivery to a user, based on user credentials, such as a user identity associated with a user account and user cryptographic information, e.g., a user password for the user account. The synthetic eSIM 208 can be used to authenticate with a local cellular wireless access network to establish a connection for downloading one or more fully functional eSIMs 208.

FIG. 3A illustrates a block diagram 300 of an exemplary network architecture that supports generation and use of synthetic eSIM 208 profiles that include synthetic IMSI and cryptographic symmetric key (K) values. A home subscription server (HSS) 306 maintains a database of subscriber information for users of mobile wireless devices 102. In some embodiments, the HSS 306 is managed by an MNO 114 and used to store IMSI values along with associated cryptographic symmetric key (K) values. The IMSI value provides a globally-unique digital identifier for a cellular wireless network subscriber and is formatted to include i) a mobile country code (MCC) value that identifies a geographic region, e.g., a country, ii) a mobile network code (MNC) value that identifies a cellular wireless network within the geographic region specified by the MCC value, and iii) a mobile subscriber identity number (MSIN) that identifies the subscriber for the particular cellular wireless network specified by the MNC value. The concatenation of an MCC value and an MNC value forms a public land mobile network (PLMN) identifier that specifies a globally-unique digital identity for a cellular wireless network. The HSS can be linked to secure credential storage 308 that maintains user credentials for users of cellular wireless services of the MNO 114. In some embodiments, the HSS 306 can be managed by a wireless device supplier or wireless device manufacturer, e.g., by Apple Inc., and can be used to generate and provide authentication for mobile wireless devices 102 of a user that subscribes to services and/or owns devices of the wireless device supplier/manufacturer. In some embodiments, the HSS 306 can generate and store synthetic IMSI values and synthetic cryptographic symmetric key (K) values based on user credentials stored in the secure credential storage 308. The mobile wireless device 102 can generate an identical synthetic IMSI value and synthetic K value as the HSS 306 using the same user credentials. The synthetic IMSI and K values can be combined with additional profile information to generate a synthetic eSIM 208 that the mobile wireless device can use to authenticate with and connect to a base station 112 of a local cellular wireless access network 302. In some embodiments, the MNO 114 that manages the local cellular wireless access network 302 has a roaming agreement with the entity that manages the HSS 306, e.g., a different MNO 114 or a device supplier/manufacturer, to allow for access to the local cellular wireless access network 302 using the synthetic eSIM 208. In some embodiments, the HSS 306 is associated with a PLMN identifier. The network of FIG. 3A further includes a 3GPP mobile application part (MAP) network that provides a network-to-network signaling interface for communication by 3GPP networks.

FIG. 3B illustrates a block diagram 350 that specifies a set of actions taken to deploy the network illustrated in FIG. 3A and establish the capability to use synthetic eSIM 208 profiles by mobile wireless devices 102. A device supplier (or a device manufacturer) procures one or more PLMN identifiers (IDs) to associate with synthetic eSIMs 208. The device supplier (or device manufacturer) deploys a custom HSS 306 to store synthetic IMSI and K values for the synthetic cSIMs 208. In some embodiments, an MNO 114 deploys or re-uses an HSS for synthetic eSIMs based on one or more PLMN IDs already assigned to or procured by the MNO 114. The device supplier (or other entity) HSS 306 is linked to a secure credential storage 308 that stores user credentials to allow the HSS 306 to generate and/or retrieve synthetic IMSI and K values associated with the user credentials. In some embodiments, the HSS 306 and/or the secure credential storage 308 generates synthetic IMSI and/or K values based on stored user credentials. In some embodiments, the HSS 306 obtains a pre-stored synthetic K value and/or a pre-stored synthetic IMSI value from a database of the secure credential storage 308 based on a user credential. Exemplary user credentials include a user identity and a user password for a user account with the device supplier/manufacturer, such as for a cloud-based service account, e.g., an iCloud® account managed by Apple Inc., a device supplier/manufacturer of mobile wireless devices 102. The HSS 306 can be connected to a 3GPP MAP network to allow for reachability of the HSS 306 from local cellular wireless access networks 302 worldwide. In some embodiments, the entity that manages the HSS 306, such as a device supplier/manufacturer, can establish roaming agreements with one or more MNOs 114 in one or more geographic regions to allow for synthetic eSIMs 208 that include the synthetic IMSI and K values to establish connections via the local cellular wireless access network 302. In some embodiments, such as when the HSS 306 is managed by an MNO 114 and the mobile wireless device 102 seeks to connect to a local cellular wireless access network 302 of the MNO 114 using a synthetic eSIM 208, a roaming agreement may not be required. One or more MNOs 114 associated with local cellular wireless access networks 302 can establish routes to the HSS 306 via the 3GPP MAP network 304. With this preparation, the MNO of the local cellular wireless access network 302 can be ready to accept connections from mobile wireless devices 102 that use synthetic eSIM 208 profiles (when authentication using the synthetic IMSI and K values is successful).

Figure 4B:
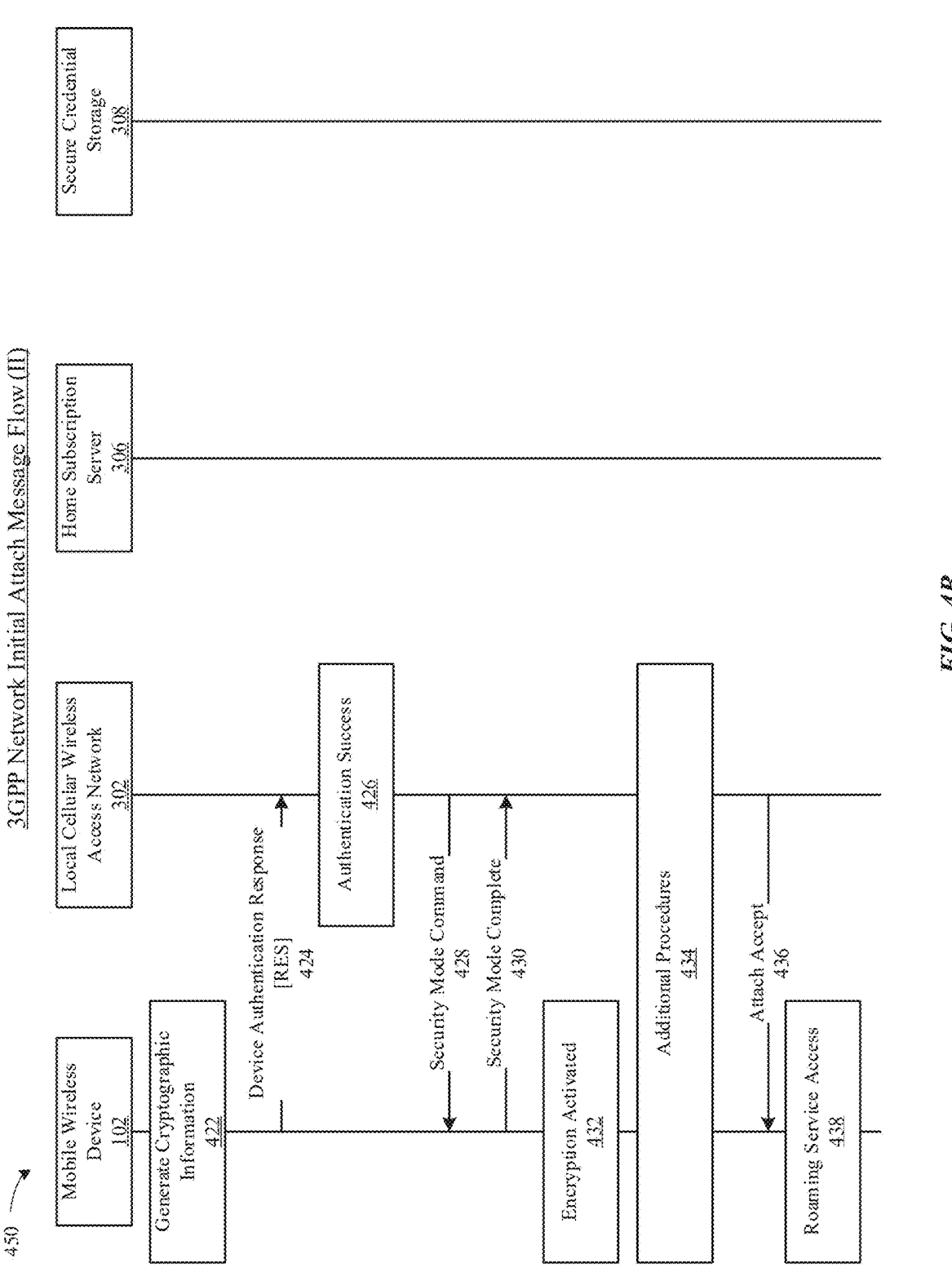

FIGS. 4A and 4B illustrate block diagrams 400, 450 of an exemplary set of actions to generate and use a synthetic eSIM 208 to attach a mobile wireless device 102 to a local cellular wireless access network 302. At 402, the mobile wireless device 102 generates a synthetic IMSI value and a synthetic cryptographic symmetric key (K) value based on user credentials. In some embodiments, the user credentials include i) a user identifier for a user account, such as an Apple ID for an iCloud account, and ii) user cryptographic information, such as a password for the user account. The mobile wireless device 102 can be configured to include instructions on how to transform the user credentials to a valid IMSI value and a valid K value, such as IMSI and K values compliant with 3GPP standardized cellular wireless networks. In some embodiments, the IMSI value and/or the K value generated by the mobile wireless device 102 depend on a geographic region in which the mobile wireless device 102 is specified or selected to operate. At 403, the mobile wireless device 102 creates and installs, on an eUICC 108 of the mobile wireless device 102, a synthetic eSIM 208 by combining the synthetic IMSI and K values with additional pre-stored (or run-time generated) eSIM 208 profile information, which can be user independent. At 404, the secure credential storage 308 generates corresponding synthetic IMSI and K values based on the identical user credentials. In some embodiments, a user of the mobile wireless device 102 has a pre-existing user account associated with the user credentials, and the synthetic IMSI and K values can be generated in advance and pre-stored at the secure credential storage 308. In some embodiments, a user of the mobile wireless device 102 establishes a new user account during or accompanying acquisition of the mobile wireless device 102. At 406, the mobile wireless device 102 sends to a local cellular wireless access network 302 in a geographic region in which the mobile wireless device 102 is operating, the attach request including the synthetic IMSI value. At 408, the local cellular wireless access network 302 identifies a route to the HSS 306 based on the synthetic IMSI value included in the attach request. The synthetic IMSI value includes an MCC value and an MNC value that indicate a PLMN ID that can be associated with the HSS 306. In some embodiments, the HSS 306 is associated with multiple PLMN IDs obtained by an entity that manages the HSS 306. At 410, the local cellular wireless access network 302 sends to the HSS 306, via the identified route, an authentication information request message that includes the synthetic IMSI value and a local network PLMN ID associated with the local cellular wireless access network 302. At 412, the HSS 306 sends to the secure credential storage 308 a 3GPP credential request message that includes the synthetic IMSI value and the local network PLMN ID. At 414, the secure credential storage 308 obtains a synthetic K value based on the synthetic IMSI value and the local network PLMN ID. In some embodiments, the HSS 306 and/or the secure credential storage 308 associates a user identifier (of user credentials used to generate the synthetic IMSI value) with a geographic region, e.g., a specific country. The HSS 306 and/or the secure credential storage 308 can determine a geographic region based on the local network PLMN ID and use the determined geographic region to affect selection of the synthetic K value. At 416, the secure credential storage 308 replies to the 3GPP credential request message from the HSS 306 with a 3GPP credential response message that includes the obtained synthetic K value. At 418, the HSS replies to the authentication information request message from the local cellular wireless access network 302 with an HSS authentication information response that includes a random number (RAND), a network authentication token (AUTN), an expected response token (XRES), and the synthetic K value. At 420, the local cellular wireless access network sends to the mobile wireless device 102 a network authentication response that includes the RAND and AUTN values. At 422, the mobile wireless device 102 generates cryptographic information, and at 424, the mobile wireless device 102 sends to the local cellular wireless access network 302 a device authentication response message that includes a response (RES). At 426, the local cellular wireless access network compares the response (RES) received from the mobile wireless device 102 to the expected response (XRES), and when they RES matches the XRES, the local cellular wireless access network 302 concludes successfully authenticates the mobile wireless device 102. At 428, the local cellular wireless access network 302 sends to the mobile wireless device 102 a security mode command and subsequently receives, from the mobile wireless device 102 at 430, a security mode complete message. At 432, encryption for communication between the mobile wireless device 102 and the local cellular wireless access network 302 is activated, and following additional procedures performed at 434 (details omitted for clarity), the local cellular wireless access network 302 sends to the mobile wireless device 102, at 436, an attach accept message indicating that mobile wireless device 102 can connect to the local cellular wireless access network 302. At 438, the mobile wireless device 102 has access to a roaming connection via the local cellular wireless access network 302 enabled by the use of the synthetic IMSI and K values. Through the roaming connection, the mobile wireless device 102 can connect to a provisioning server 116 of an MNO 114 to obtain a fully functional eSIM 208.

Generating synthetic IMSI and K values to use to assemble a synthetic eSIM 208 can be applied to multiple pairs of user identity and associated user cryptographic information, such as those used by an MNO 114 for subscription to a cellular wireless service, such as AT&T or Verizon, those used by a wireless device manufacturer or supplier for access to a range of services, such as Apple or Google, or those used by a software supplier for subscription to services, such as Microsoft. In some embodiments, the synthetic eSIM 208 can be used as a fully functional eSIM 208, such as when the user identity and associated user cryptographic information as associated with a subscription to a cellular wireless service of an MNO 114. In some embodiments, the synthetic eSIM 208 can be used for authentication to obtain cellular wireless access via a local cellular wireless access network, including while roaming, to connect to a provisioning server 116 of an MNO 114 to obtain a fully functional eSIM 208. The mobile wireless device 102 can include pre-loaded software to generate the synthetic IMSI and K values and combine with additional pre-loaded (and/or run-time generated) eSIM profile information to form the synthetic eSIM 208. An HSS 306 and secure credential storage 308 can generate corresponding identical IMSI and K values and associate them with a user identity. The synthetic IMSI uniquely identifies the mobile wireless device 102 and the synthetic K provides for authentication of the mobile wireless device 102 with the local cellular wireless access network. In some embodiments, different synthetic IMSI and/or K values can be generated and used for different geographic regions, e.g., according to standardized formats for the IMSI and K values as used for a geographic region designated (or selected) for use of the mobile wireless device 102. In some embodiments, the synthetic IMSI value is generated to be consistent with a location of the HSS 306 with which the mobile wireless device 102 is configured to communicate for authentication. In some embodiments, when the HSS 306 is located in North America, the synthetic IMSI is generated to accord with IMSI values used in North America. In some embodiments, when the HSS 306 is located outside of North America, the synthetic IMSI is generated to accord with IMSI values used outside of North America. Transformation of user identity and user cryptographic information to synthetic IMSI and K values can be performed on the mobile wireless device 102 and within the corresponding network domains (e.g., MNO 114, device manufacturer/supplier, software service provider, etc.) a priori, without requiring handshaking or other information exchange at runtime.

FIG. 5A illustrates a block diagram 500 of an exemplary transformation of a user identity to a 3GPP-compliant synthetic IMSI value applicable for use inside the North America geographic region. A user identity can be a user identifier (ID) 502 for a user account, such as for an iCloud account. The user ID 502, which can be combination of alphanumeric (or other ASCII) characters, can be input to a 32-bit hash function 504 to produce a 32-bit hashed user ID 506 value. In some embodiments, the 32-bit hash function 504 can be a non-cryptographic hash function, such as MurmurHash3. At 508, the upper three bits of the 32-bit hashed user ID 506 value can be extracted to form a 3-bit PLMN ID selector 510. At 512, a 6-digit PLMN ID 514 value can be determined based on the 3-bit PLMN ID selector 510. The 3-bit PLMN ID selector 510 allows for up to eight different PLMN IDs to be used by the network entity, e.g., a device manufacturer/supplier or an MNO 114, within a geographic region. The 6-digit PLMN ID 514 value can include a 3-digit mobile country code (MCC) value and a 3-digit mobile network code (MNC) value. In parallel at 518, the lower 29 bits of the 32-bit hashed user ID 506 value can be extracted to form a 29-bit mobile subscriber identification number (MSIN) selector 520. At 522, the 29-bit MSIN selector 520 can be used to determine a 9-digit MSIN 524 value. At 526, the 6-digit PLMN ID 514 value can be concatenated with the 9-digit MSIN 524 value to form a valid, 3GPP-compliant 15-digit synthetic IMSI 528 value. IMSI values for the North America geographic region use 3-digit MNC values and 9-digit mobile subscriber identification number (MSIN) values. Instructions to transform the user ID 502 to the 15-digit synthetic IMSI 528 can be stored in firmware of the mobile wireless device 102 and at the secure credential storage 308 (and/or at the HSS 306 in some embodiments). The transformation illustrated provides an example; however, other transformations of a user ID 502 to an IMSI value are possible.

Figure 5B:
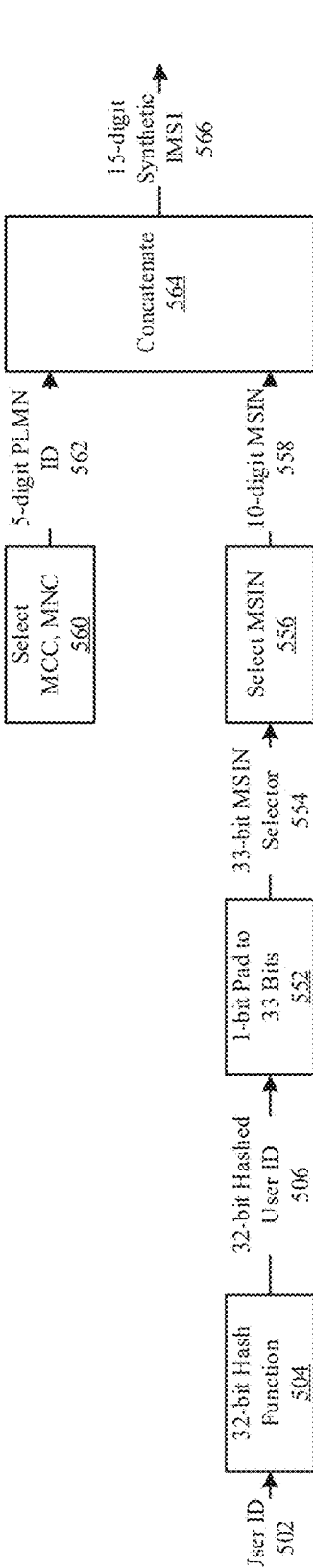
FIG. 5B illustrates a block diagram of an exemplary transformation of a user identity to a 3GPP-compliant synthetic IMSI value for use outside of the North America geographic region, according to some embodiments.

FIG. 5B illustrates a block diagram 550 of an exemplary transformation of a user identity to a 3GPP-compliant synthetic IMSI value applicable for use outside of the North America geographic region. A user identity can be a user identifier (ID) 502 for a user account, such as for an iCloud account. The user ID 502, which can be combination of alphanumeric (or other ASCII) characters, can be input to a 32-bit hash function 504 to produce a 32-bit hashed user ID 506 value. In some embodiments, the 32-bit hash function 504 can be a non-cryptographic hash function, such as MurmurHash3. In some embodiments, a common 32-bit hash function 504 can be used in different geographic regions. In some embodiments, different 32-bit hash functions 504 can be used in different geographic regions. At 552, the 32-bit hashed user ID 506 value can be padded with an additional bit to form a 33-bit MSIN selector 554 value. At 556, the 33-bit MSIN selector 554 value can be used to determine a 10-digit MSIN 558 value. At 560, a 5-digit PLMN ID 562 value can be selected. In some embodiments, the network entity, e.g., a device manufacturer/supplier or an MNO 114, uses a single PLMN ID value for a geographic region outside of North America. In some embodiments, the network entity, e.g., a device manufacturer/supplier or an MNO 114, uses multiple PLMN ID values for one or more geographic regions outside of North America. The 5-digit PLMN ID 562 value can include a 3-digit mobile country code (MCC) value and a 2-digit mobile network code (MNC) value. At 564, the 5-digit PLMN ID 562 value can be concatenated with the 10-digit MSIN 558 value to form a valid, 3GPP-compliant 15-digit synthetic IMSI 566 value. IMSI values outside the North America geographic region use 2-digit MNC values and 10-digit mobile subscriber identification number (MSIN) values. Instructions to transform the user ID 502 to the 15-digit synthetic IMSI 566 can be stored in firmware of the mobile wireless device 102 and at the secure credential storage 308 (and/or at the HSS 306 in some embodiments). The transformation illustrated provides an example; however, other transformations of a user ID 502 to an IMSI value are possible.

Figure 5C:
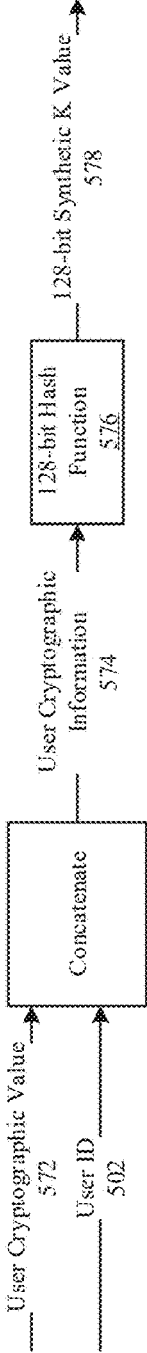
FIG. 5C illustrates a block diagram of an exemplary transformation of a user identity and user cryptographic information to a synthetic cryptographic symmetric key (K) value, according to some embodiments.

FIG. 5C illustrates a block diagram 570 of an exemplary transformation of a user identity and user cryptographic information to a synthetic cryptographic symmetric key (K) value. A user cryptographic value 572, such as a password for a user account, and a user ID 502 value, such as a user ID for the user account, can be concatenated to form user cryptographic information 574. The combination of the user ID 502 value and the user cryptographic value 572 can uniquely identify a user of a mobile wireless device 102. The user ID 502 value can be a user identifier for a user account, such as for an iCloud account. The user cryptographic value 572 can be a password associated with the user account. At 576, the user cryptographic information 574 can be input to a 128-bit hash function 576 to produce a 128-bit synthetic symmetric key (K) value 578. In some embodiments, the 128-bit hash function can be cryptographic hash function, such as one of a secure hash algorithm (SHA) family of cryptographic hash functions. In some embodiments, the cryptographic has function produces a result with more than 128 bits, and only 128 bits of the resulting output are used as the 128-bit synthetic K value 578. Instructions to transform the user ID 502 and user cryptographic value 572 to the 128-bit synthetic K value 578 can be stored in firmware of the mobile wireless device 102 and at the secure credential storage 308 (and/or at the HSS 306 in some embodiments). The transformation illustrated provides an example; however, other transformations of a user ID 502 and user cryptographic value 572 to a cryptographic symmetric key K value are possible.

Figure 6:
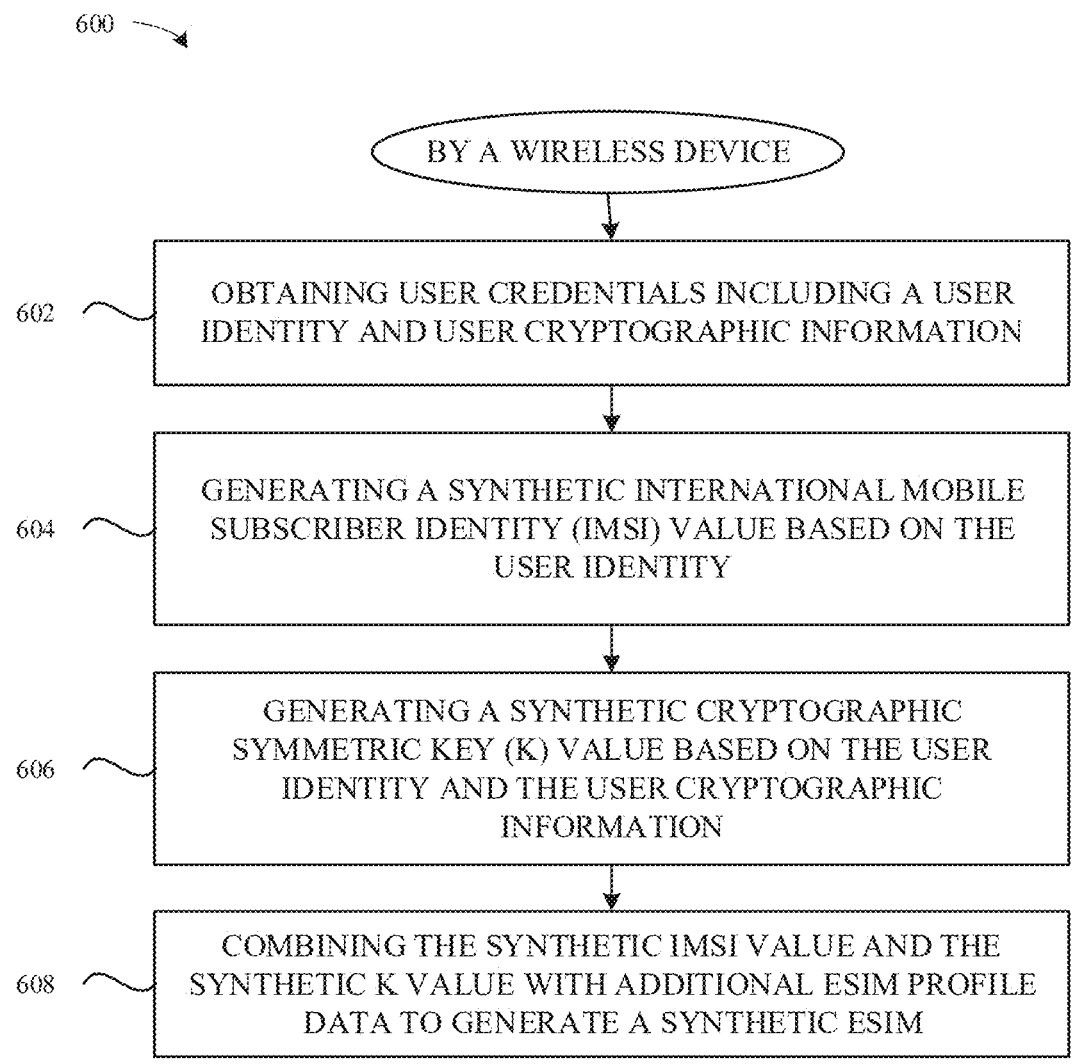
FIG. 6 illustrates a flowchart of an exemplary set of actions performed by a wireless device to generate a synthetic eSIM, according to some embodiments.

FIG. 6 illustrates a flow chart 600 of an exemplary set of actions performed by a wireless device 102 to generate a synthetic eSIM 208 for the wireless device 102. At 602, the wireless device 102 obtains user credentials that include a user identity and user cryptographic information. At 604, the wireless device 102 generates a synthetic IMSI value based on the user identity. At 606, the wireless device 102 generates a synthetic cryptographic symmetric key K value based on the user identity and the user cryptographic information. At 608, the wireless device 102 combines the synthetic IMSI value and the synthetic K value with additional eSIM 208 profile data to generate the synthetic eSIM 208. The additional eSIM 208 profile data can include information other than the synthetic IMSI value and the synthetic K value which are important to interacting with a cellular wireless network. The additional eSIM 208 profile data can be not specific to a user of the wireless device 102. In some embodiments, the additional eSIM 208 profile data can be pre-configured in firmware of the wireless device 102. in some embodiments, the additional eSIM 208 profile data can be generated at runtime based on one or more criteria, such as a geographic region in which the wireless device 102 is operating and/or designated to operate.

In some embodiments, the user identity includes a user login for a user account, and the user cryptographic information includes a password for the user account. In some embodiments, the user account includes a cloud-based service account, e.g., an iCloud account, associated with a device manufacturer of the wireless device, e.g., Apple Inc. In some embodiments, the user account includes a subscriber account associated with an MNO 114, e.g., AT&T, Verizon, or T-Mobile. In some embodiments, the wireless device 102 generates the synthetic IMSI value by: i) generating a 32-bit hash value based on the user identity, ii) selecting a public land mobile network (PLMN) identity value based on one or more bits of the 32-bit hash value; iii) mapping remaining bits of the 32-bit hash value to a 9-digit mobile subscriber identity number (MSIN) value; and iv) concatenating the PLMN identity value with the 9-digit MSIN value to form the synthetic IMSI value. In some embodiments, the PLMN identity value is further selected based on a geographic region identified for operation of the wireless device 102. In some embodiments, the wireless device 102 generates the synthetic IMSI value by: i) generating a 32-bit hash value based on the user identity; ii) mapping the 32-bit hash value combined with one additional bit to a 10-digit mobile subscriber identity number (MSIN) value; and iii) concatenating a PLMN identity value with the 10-digit MSIN value to form the synthetic IMSI value. In some embodiments, the wireless device 102 generates the synthetic K value by generating a 128-bit hash value based on a concatenation of the user identity with the user cryptographic information, where the synthetic K value includes the 128-bit hash value. In some embodiments, the synthetic eSIM 208 enables the wireless device 102 to establish a cellular wireless connection with a local cellular wireless provider to obtain a fully function eSIM 208. In some embodiments, the additional eSIM profile data, other than the synthetic IMSI value and synthetic K value, is pre-stored in the wireless device 102 at a time of manufacture. In some embodiments, the additional eSIM profile data is generated at runtime in the wireless device 102, such as during a setup process and/or during an eSIM 208 acquisition procedure. In some embodiments, generating the additional eSIM profile data is based on a geographic region identified for operation of the wireless device.

FIG. 7 illustrates a flowchart 700 of an exemplary set of actions performed by a wireless device 102 to authenticate with a local cellular wireless access network. At 702, the wireless device 102 generates a synthetic international mobile subscriber identity (IMSI) value and a synthetic cryptographic symmetric key (K) value based on user credentials. At 704, the wireless device 102 sends, to the local cellular wireless access network, an attach request that includes the synthetic IMSI value. At 706, the wireless device 102 receives, from the local cellular wireless access network, a network authentication response that includes authentication parameters. At 708, the wireless device 102 generates a device authentication response based on the authentication parameters and the synthetic K value. At 710, the wireless device 102 sends, to the local cellular wireless access network, the device authentication response to authenticate the wireless device with the local cellular wireless access network. At 712, the wireless device 102 receives, from the local cellular wireless access network subsequent to successful authentication and additional security procedures, an attach accept message.

In some embodiments, the user credentials include a user identity and user cryptographic information. In some embodiments, generating the synthetic IMSI value is based on the user identity, and generating the synthetic K value is based on the user cryptographic information. In some embodiments, the user identity includes a user login for a user account; and the user cryptographic information includes a password for the user account. In some embodiments, the wireless device 102 generates the synthetic IMSI value by: i) generating a 32-bit hash value based on the user identity, ii) selecting a public land mobile network (PLMN) identity value based on one or more bits of the 32-bit hash value and a geographic region identified for operation of the wireless device; iii) mapping remaining bits of the 32-bit hash value to a 9-digit mobile subscriber identity number (MSIN) value; and iv) concatenating the PLMN identity value with the 9-digit MSIN value to form the synthetic IMSI value. In some embodiments, the wireless device 102 generates the synthetic IMSI value by: i) generating a 32-bit hash value based on the user identity, ii) mapping the 32-bit hash value combined with one additional bit to a 10-digit mobile subscriber identity number (MSIN) value, and iii) concatenating a PLMN identity value with the 10-digit MSIN value to form the synthetic IMSI value. In some embodiments, the wireless device 102 generates the synthetic K value by generating a 128-bit hash value based on a concatenation of the user identity with the user cryptographic information, where the synthetic K value includes the 128-bit hash value. In some embodiments, the local cellular access network authenticates the wireless device based on verifying the device authentication response using a corresponding synthetic K value obtained from a home subscription server (HSS).

FIG. 8 illustrates a flowchart 800 of an exemplary set of actions to deploy a cellular wireless network that supports synthetic eSIMs 208. At 802, a home subscription server (HSS) is deployed and linked to a secure credential storage that stores multiple synthetic symmetric key (K) values, each synthetic K value associated with a corresponding user identity. At 804, the HSS is connected to a 3GPP mobile application part (MAP) network to enable reachability of the HSS from a local cellular wireless access network. At 806, a roaming agreement is established with an MNO 114 associated with the local cellular wireless access network. At 808, routing is configured to the HSS from the local cellular wireless access network. At 810, the local cellular wireless access network allows connections from a wireless device 102 that uses a synthetic eSIM 208 profile that includes a synthetic K value. In some embodiments, the synthetic eSIM 208 also includes a synthetic IMSI value. In some embodiments, the HSS obtains a corresponding synthetic K value associated with the synthetic IMSI value and provides the corresponding synthetic K value to the local cellular wireless access network to authenticate the wireless device 102 when establishing a connection between the wireless device 102 and the local cellular wireless access network.

Representative Exemplary Apparatus

FIG. 9 illustrates in block diagram format an exemplary computing device 900 that can be used to implement the various components and techniques described herein, according to some embodiments. In particular, the detailed view of the exemplary computing device 900 illustrates various components that can be included in the mobile wireless device 102. As shown in FIG. 9, the computing device 900 can include one or more processors 902 that represent microprocessors or controllers for controlling the overall operation of computing device 900. In some embodiments, the computing device 900 can also include a user input device 908 that allows a user of the computing device 900 to interact with the computing device 900. For example, in some embodiments, the user input device 908 can take a variety of forms, such as a button, keypad, dial, touch screen, audio input interface, visual/image capture input interface, input in the form of sensor data, etc. In some embodiments, the computing device 900 can include a display 910 (screen display) that can be controlled by the processor(s) 902 to display information to the user (for example, information relating to incoming, outgoing, or active communication sessions). A data bus 916 can facilitate data transfer between at least a storage device 940, the processor(s) 902, and a controller 913. The controller 913 can be used to interface with and control different equipment through an equipment control bus 914. The computing device 900 can also include a network/bus interface 911 that couples to a data link 912. In the case of a wireless connection, the network/bus interface 911 can include wireless circuitry, such as a wireless transceiver and/or baseband component. The computing device 900 can also include a secure element 924. The secure element 924 can include an eUICC 108.

The computing device 900 also includes a storage device 940, which can include a single storage or a plurality of storages (e.g., hard drives), and includes a storage management module that manages one or more partitions within the storage device 940. In some embodiments, storage device 940 can include flash memory, semiconductor (solid state) memory or the like. The computing device 900 can also include a Random-Access Memory (RAM) 920 and a Read-Only Memory (ROM) 922. The ROM 922 can store programs, utilities or processes to be executed in a non-volatile manner. The RAM 920 can provide volatile data storage, and stores instructions related to the operation of the computing device 900.

Wireless Terminology

In accordance with various embodiments described herein, the terms "wireless communication device," "wireless device," "mobile device," "mobile station," "mobile wireless device," and "user equipment" (UE) may be used interchangeably herein to describe one or more consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near-field communication (NFC), a cellular wireless network, a fourth generation (4G) LTE, LTE Advanced (LTE-A), 5G, and/or 6G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) RATs. In these scenarios, a multi-mode user equipment (UE) can be configured to prefer attachment to LTE and/or 5G wireless networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE, LTE-A, and/or 5G wireless networks are otherwise unavailable.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for supporting synthetic electronic subscriber identity modules (eSIMs), the method comprising:

obtaining one or more public land mobile network (PLMN) identifier (ID) values;

connecting a home subscription server (HSS) to a third generation partnership project (3GPP) mobile application part (MAP) network to enable reachability of the HSS from a local cellular wireless access network, wherein the HSS is linked to a secure credential storage that stores a plurality of synthetic symmetric key (K) values, each synthetic K value associated with a corresponding user identity;

establish a roaming agreement with a mobile network operator (MNO) associated with the local cellular wireless access network, configuring routing to the HSS from the local cellular wireless access network; and allowing a connection to the local cellular wireless access network from a wireless device that uses a synthetic eSIM profile that includes a synthetic K value.

2. The method of claim 1, wherein the synthetic eSIM profile further includes additional eSIM profile data installed in the wireless device at a time of manufacture.

3. The method of claim 1, wherein the corresponding user identity comprises a corresponding user login for a user account.

4. The method of claim 3, wherein the user account comprises a cloud-based service account associated with a device manufacturer of the wireless device.

5. The method of claim 3, wherein the user account comprises a subscriber account associated with the MNO.

6. The method of claim 1, wherein each PLMN ID value of the one or more PLMN ID values correspond to a geographic region identified for operation of one or more wireless devices.

7. The method of claim 1, wherein the synthetic eSIM profile enables the wireless device to establish the connection with the local cellular wireless access network in accordance with the roaming agreement with the MNO.

8. The method of claim 7, wherein the connection with the local cellular wireless access network via the synthetic eSIM profile permits the wireless device to obtain a fully functional eSIM.

9. The method of claim 1, wherein the synthetic eSIM profile is based on the synthetic K value and a synthetic international mobile subscriber identity (IMSI) value generated by the wireless device based on the corresponding user identity.

10. The method of claim 1, wherein the HSS is configured to generate a synthetic international mobile subscriber identity (IMSI) value based on the corresponding user identity of the wireless device.

11. The method of claim 1, wherein the HSS is configured to generate the synthetic K value for the wireless device based on the corresponding user identity of the wireless device.

12. A home subscription server (HSS) linked to a secure credential storage, wherein:

the HSS is connected to a third generation partnership project (3GPP) mobile application part (MAP) network to enable reachability of the HSS from a local cellular wireless access network;

the secure credential storage stores a plurality of synthetic symmetric key (K) values, each synthetic K value associated with a corresponding user identity; and the HSS is configured to allow a connection via the local cellular wireless access network from a wireless device using a synthetic eSIM profile that includes a synthetic K value.

13. The HSS of claim 12, wherein the synthetic eSIM profile further includes additional eSIM profile data installed in the wireless device at a time of manufacture.

14. The HSS of claim 12, wherein the corresponding user identity comprises a corresponding user login for a user account.

15. The HSS of claim 14, wherein the user account comprises a cloud-based service account associated with a device manufacturer of the wireless device.

16. The HSS of claim 14, wherein the user account comprises a subscriber account associated with a mobile network operator (MNO).

17. The HSS of claim 12, wherein the synthetic eSIM profile enables the wireless device to establish the connection with the local cellular wireless access network in accordance with a roaming agreement with a mobile network operator (MNO).

18. The HSS of claim 17, wherein the connection with the local cellular wireless access network via the synthetic eSIM profile permits the wireless device to obtain a fully functional eSIM.

19. The HSS of claim 12, wherein synthetic eSIM is based on the synthetic K value and a synthetic international mobile subscriber identity (IMSI) value generated by the wireless device based on the corresponding user identity.

20. The HSS of claim 12, wherein the HSS is configured to generate a synthetic international mobile subscriber identity (IMSI) value based on the corresponding user identity of the wireless device.

* * * * *